US007612463B2

(12) United States Patent
Cullen et al.

(10) Patent No.: US 7,612,463 B2

(45) Date of Patent: Nov. 3, 2009

(54) GENERATOR

(75) Inventors: John James Anthony Cullen, Chellaston (GB); Andrew Martin Rolt, Derby (GB)

(73) Assignee: Rolls-Royce plc, London (GB)

( * ) Notice: Subject to any disclaimer, the term of this patent is extended or adjusted under 35 U.S.C. 154(b) by 31 days.

(21) Appl. No.: 11/480,552

(22) Filed: Jul. 5, 2006

(65) Prior Publication Data

US 2007/0007857 A1 Jan. 11, 2007

(30) Foreign Application Priority Data

Jul. 6, 2005 (GB) ................................ 0513821.9

(51) Int. Cl.
*F03D 9/00* (2006.01)

(52) U.S. Cl. .......................................... 290/55; 290/44

(58) Field of Classification Search .................. 290/44, 290/55; 415/4.5, 2.1, 4.2; 60/398, 698; 416/132 B
See application file for complete search history.

(56) References Cited

U.S. PATENT DOCUMENTS 2,106,557 A * 1/1938 Putnam ....................... 290/44
2,862,122 A * 11/1958 Courtin ....................... 310/87
3,401,328 A * 9/1968 Hartung ....................... 322/28
3,611,230 A * 10/1971 Maake ........................ 336/120
4,427,897 A * 1/1984 Migliori ...................... 290/44
4,982,123 A * 1/1991 Raad ........................ 310/68 D
5,608,771 A 3/1997 Steigerwald
5,742,515 A * 4/1998 Runkle et al. ............... 700/287
5,783,894 A * 7/1998 Wither ....................... 310/266
6,242,818 B1 * 6/2001 Smedley ...................... 290/44
6,249,058 B1 * 6/2001 Rea ............................ 290/55
6,333,581 B1 12/2001 Kohl
6,483,218 B1 * 11/2002 Petrinko ..................... 310/112
6,734,576 B2 * 5/2004 Pacheco ...................... 290/55

(Continued)

FOREIGN PATENT DOCUMENTS

DE 19953583 C1 12/2001

(Continued)

*Primary Examiner*—Julio Cesar Gonzalez
(74) *Attorney, Agent, or Firm*—Jeffrey S. Melcher; Manelli Denison & Selter PLLC

(57) ABSTRACT

Within a power generating arrangement 1 it is typically necessary to provide a coupling with an electrical power distribution cable 5. Previously this was sometimes achieved through use of brush gear and slip rings but such arrangements are subject to regular replacement for wear, maintenance and also there is a requirement to control humidity about the brush gear coupling. Alternatively, a system allowing an amount of rotation, limited by cable wind up was used. By providing a transformer in which windings 15, 16; 36, 37 are physically separated by an air gap 14, 39, but still induce voltage from variation in the magnetic flux, it is possible to create a power generating transfer transformer which can be rotated while driving electrical current for an external load. One component 10, 38 acts as a stationary stator for ease of coupling to a power distribution cable 5 whilst the other rotating component incorporates another winding 16, 36 with an alternating current in it in order to stimulate a voltage and therefore current in the stationary winding 15, 37 for driving electrical current through to the external electrical load 40.

8 Claims, 1 Drawing Sheet

U.S. PATENT DOCUMENTS

| | | | | |
|---|---|---|---|---|
| 6,787,948 | B2 * | 9/2004 | Peterson et al. | 310/58 |
| 6,891,460 | B2 * | 5/2005 | Tezuka et al. | 336/130 |
| 2003/0209912 | A1 * | 11/2003 | Badger | 290/55 |
| 2004/0012207 | A1 * | 1/2004 | Nagy | 290/55 |
| 2005/0140483 | A1 | 6/2005 | Wobben | |

FOREIGN PATENT DOCUMENTS

| | | | |
|---|---|---|---|
| WO | WO 03/065389 | A | 8/2003 |
| WO | WO 03/081615 | A | 10/2003 |

* cited by examiner

GENERATOR

FIELD OF THE INVENTION

The present invention relates to electrical power generators and more particularly to generators and transformers used with respect to marine current or wind power electrical generation.

BACKGROUND OF THE INVENTION

It will be understood that electrical power generators and transformers are utilised in order to convert electrical power in terms of electrical voltage or current as well as with respect to power generation. One example of a transformer is of the rotating transformer type described in U.S. Pat. No. 3,611,230. Such rotating transformers act to couple electrical energy between a stator and a rotor member without physical contact between the moving rotating members. In such circumstances, a means for transferring electrical current in the generator between the rotating and stationary frames is provided without use of electrical brush gear. It will also be understood with respect to transformers utilised for wind generation that it is also known to use fixed cable connections with flexible cables and control systems that limit the wind up of the cables as a result of rotation of the turbine into the wind or marine current.

There is increasing desire to utilise renewable forms of energy for electrical power generation. Unfortunately previous rotating transformer designs were not typically specified for wind power generation and in particular operation at the level of electrical power generated, which is normally at least several hundred kilowatts. In such circumstances, prior arrangements have typically depended upon electrical brushgear which in turn requires considerable maintenance and care with respect to the atmosphere about the brushes in terms of humidity for correct operation of the brushes. In addition, fixed or flexible cable connections may not be utilised in certain unconventional wind turbine designs. With regard to a conventional horizontal axis wind power turbine, vanes can be used to orientate the turbine into the wind, without the complexity of currently used drive motors, control logic and sensors, provided the transformer will transform the power from the rotating frame of the turbine to the stationary frame.

It will be appreciated that brushless transfer is important with regard to power generation. Typically, electrical power will be generated by relative movement of a winding relative to an array of alternately polarised (i.e. north, south, north, south, etc.) permanent magnets in order to induce an alternating electric current. With an electrical generator, mechanical action to cause rotation is provided by a wind turbine or other power source.

SUMMARY OF THE INVENTION

In accordance with the present invention there is provided an electrical power generator is provided which comprises a stationary frame/cable connected to the ground, a rotating frame/wing carrying an electrical generator(s) and a rotating transformer transferring electrical power from the rotating frame to the stationary frame, the transformer being of a rotating transformer type comprising a stator and a rotor arranged to rotate about an axis of the stator core with a gap therebetween, the stator and the rotor respectively having electrical windings arranged to create a magnetic flux which circulates between the stator and the rotor upon application of an alternating electrical current in one electrical winding in either the stator or the rotator so that a voltage is induced in the other electrical winding for a driving electrical current so that electrical power is transferred between the windings across the gap through the stator and rotor.

Possibly, the stator and the rotor comprise sleeves with end discs which project towards each other with the gap being an air gap between them. Alternatively, the gap may be filled with water or oil.

Preferably, the stator and the rotor are formed from materials known as soft iron magnetically permeable materials, including soft iron, nickel, cobolt and alloys thereof.

Typically, the stator includes a hollow core for electrical cables coupled to the winding for delivery of the driving electrical current.

Possibly, one of the electrical windings has a variable tap to allow variation in the voltage and current input/output ratios.

Typically in a multiphase power system there will be one rotatable transformer for each phase, with the transformers arranged coaxially in sequence and probably packaged as a single assembly.

Also, in accordance with the present invention there is provided an electrical power generator and a rotatable power source subject to rotation.

BRIEF DESCRIPTION OF THE DRAWINGS

Typically, the rotatable power source is a wind turbine.

An embodiment of the present invention will now be described by way of example and with reference to the accompanying drawings in which.

DETAILED DESCRIPTION OF THE INVENTION

As indicated above, an electrical generator to transfer electrical power without use of electrical brush gear with slip rings for electrical power generation at the levels typical with regard to wind power applications has not been known. As indicated, brush gear requires considerable maintenance and is subject to wear especially if not presented in the correct atmosphere for operation of the brushes.

Figure 1:
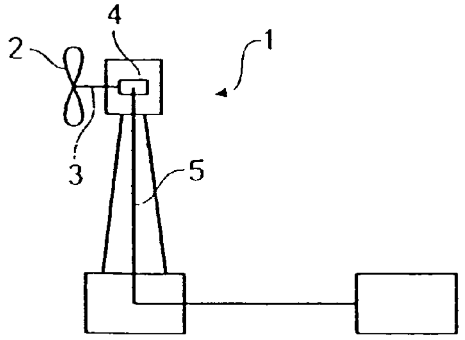
FIG. 1 is a schematic illustration of a ground-based wind power electrical generator in accordance with aspects of the present invention.

FIG. 1 illustrates schematically a typical land-based wind turbine electrical power generator arrangement 1 in which blades 2 create rotation of a shaft 3 in order that an electrical current is generated of a typically alternating nature in electrical generator windings (not shown) due to that rotation. Within the arrangement, a coupling 4 is provided whereby the electrical power generated is transferred to a power cable 5 which in turn is coupled to an external electrical load. Any transformer used is simply there to charge voltage and is not there to allow relative rotation between a stator and a rotor. Generally, the electrical power generator comprises a stationary frame connected to the ground, a rotating frame carrying at least one electrical generator and a transformer for transferring electrical power between the rotating frame and the stationary frame.

Where an altitude wind generator is used to generate electricity it will be understood that the electricity is generated in a frame such as a wing which is moving (specifically rotating) with respect to the cable that carries the electricity to an external load via the ground. Here a rotating transformer is needed to transfer the electrical power from the rotating frame of the generator on the wing to the stationary frame having the cable. The present invention relates to a coupling in terms of the means by which the electrical power is transferred from the rotating components of the arrangement to the stationary power transmission network, that is to say to a power cable.

Figure 2A:
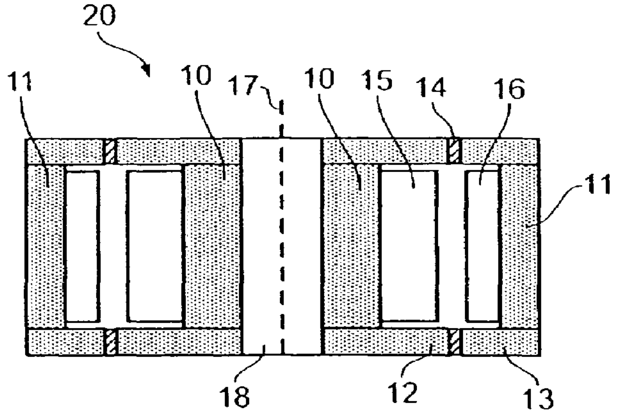
FIG. 2A is a schematic cross section of a transformer in accordance with aspects of the present invention; and, FIG. 2B is a schematic illustration of a rotor being coupled to a generator in accordance with aspects of the present invention; and, FIG. 3 is a schematic longitudinal depiction of a transformer in accordance with aspects of the present invention.

FIG. 2 provides a schematic cross section through the transformer utilised in accordance with aspects of the present invention is an electrical power generator to transfer electrical power across the rotating coupling described with respect to FIG. 1. Thus, the transformer is of a rotating type in which a stator 10 is opposed by a rotor 11 upon which end discs 12, 13 are secured with an air gap 14 between them. The stator 10 and rotor 11 respectively have electrical windings 15, 16.

The stator 10 is static whilst the rotor 11 rotates about an axis of rotation 17 passing through a centre axis of the stator 10. In such circumstances the transformer 20 is axisymmetrical about the axis of rotation 17. It will be understood that mechanical bearings to support the rotor weight and allow rotation are provided in the transformer 20 but these are not shown in FIG. 2.

Figure 2B:
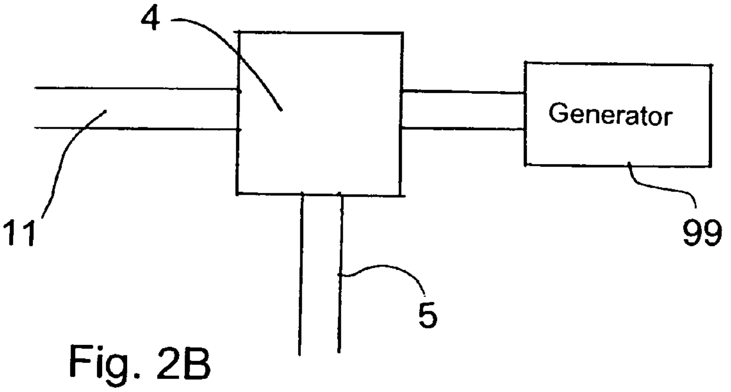

The rotor 11 is generally coupled to a generator 99, as illustrated in FIG. 2B, whereby electrical current is generated. However, an alternating electrical current from that generator 99 winding is coupled to the electrical winding 16 in the rotor 11 such that a magnetic flux is generated which circulates through the soft iron of the rotor 11, end discs 12, 13 and stator 10 bridging the air gap 14. The value of the magnetic flux is proportional to the instantaneous electrical current passing through the winding 16. In such circumstances, the other electrical winding 15 is linked by a time varying magnetic flux generated by the alternating electrical current in the first winding 16 such that an electrical voltage is induced in the other winding 15. This induced voltage drives an electrical current in the winding 15 which is coupled to an external electrical load (not shown) through an appropriate electrical distribution cable (cable 5 in FIG. 1). In such circumstances, electrical power is transferred across the gap 14 without the requirement for brush gear. The generator with the transformer in accordance with the present invention avoids brush maintenance and replacement through wear. It will also be understood that problems associated with maintaining a suitable environment about the brushes for correct operation in terms of humidity, etc are avoided.

It will be appreciated that in accordance with the invention one component, that is to say the stator, will be stationary, whilst the other is rotating about an axis of rotation. In such circumstances, in the embodiment depicted in FIG. 2, a central cavity 18 is provided within which electrical cables (cable 5 in FIG. 1) may be accommodated in order to receive transfer of electrical power through a winding 15 for transmission to an appropriate external electrical load as described above.

Figure 3:
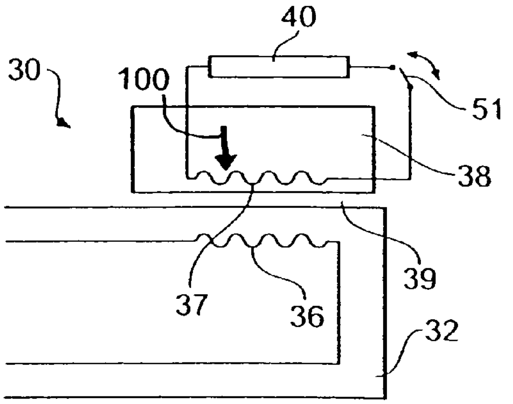

FIG. 2 illustrates one embodiment or configuration of a transformer, but it will be appreciated as depicted in FIG. 3, an alternative embodiment or configuration is to arrange for a central core to rotate whilst the external sleeve or sheath parts of a transformer 30 are stationary.

The transformer 30 comprises a number of components. An electrical generator is electrically connected to a primary winding 36 of transformer 30 in association with a secondary winding 37 in a stationary stator 38. In such circumstances, in a similar situation to the first embodiment depicted in FIG. 2, an electric current generated by the electrical generator is supplied to a primary winding 36 equivalent to the first winding 16 in FIG. 2. In such circumstances this winding 36 rotates as described above with a gap 39 between that rotor 32 and the stator 38. The magnetic flux created by the winding 36 therefore creates a voltage in the secondary winding 37 of the transformer coupling in the stator 38 such that electrical power is transferred across the gap 39 in order that a driving current can then be provided to an electrical load 40 controlled by a switch 51. Such electrical power transfer is achieved without brush connections between the rotating shaft 32 and the stationary stator 38, so avoiding the problems with such brush gear in a power generating application such as that of a wind turbine.

It is known that the number of turns in the windings 15, 16; 36, 37 in the transformer interact (along with other factors such as the magnetically permeable materials about which the windings 15, 16; 36, 37 are formed) to correctly influence the induced voltage and therefore the driving electrical current, etc. In such circumstances, as with conventional transformer types, it should be possible with conventional means to provide a tap varying facility, as indicated by arrow 100 in FIG. 3, with regard to the windings 15, 16; 36, 37 in order to allow the induced voltage and therefore current input/output ratio to be adjusted dependent upon the electrical load 40 requirements. Thus, power transfer or power generation may be adjusted for operational efficiency and to remain within safety limits.

The present transformer will pass power in either direction across the air-gap. Hence it is just as applicable where a motor or any other electrical load has to be supplied through a joint in which unlimited rotational movement must be accommodated.

Modification and variations with respect to the transformer will be appreciated by those skilled in the technology. Thus, the transformer may have an air gap between the rotating and stationary parts but where used in a marine application the gap may be liquid filed, such as with water or an oil. If the liquid were sea water and so an electrical conductor it will be understood that the gap will be oil filled. It will be understood that the present transformer could be utilised with wind turbines or marine/current turbines. Furthermore, with wind power turbines these could operate at high altitude without the connect to the ground.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electrical power generator is provided which comprises a stationary frame connected to the ground, a rotating frame carrying an electrical generator(s) to generate electrical power within said rotating frame, and a rotating transformer arranged to transfer said electrical power from the rotating frame to the stationary frame, the transformer being of a rotating transformer type comprising a stator and a rotor arranged to rotate about an axis of the stator core with a gap therebetween, said rotor and said stator being arranged coaxially wherein said rotor is arranged radially about said stator, said stator and said rotor respectively having electrical windings arranged to create a magnetic flux which circulates between the stator and the rotor upon application of said electrical power as an alternating electrical current in one electrical winding in either the stator or the rotator so that a voltage is induced in the other electrical winding relative said alternating electrical current for a driving electrical current so that electrical power generated within said rotating frame is transferred between the windings across the gap between the stator and rotor despite relative rotation about an axis of the stator core, said stator having a hollow core for electrical cables coupled to the winding for delivery of said driving electrical current, said rotating frame carrying a power source to drive rotation, said stationary frame comprises said electrical cables, said rotatable power source being arranged to drive said electrical generator, said power source being at least one turbine having blades driven by the force of a fluid acting on said turbine blades wherein said at least one turbine is a wind turbine designed to operate at high altitudes wherein said wind turbine is free from a rigid connection to the ground and wherein said stationary frame comprises said electrical cables.

2. A generator as claimed in claim 1 wherein the stator and the rotor comprise sleeves with end discs which project towards each other with the gap between them.

3. A generator as claimed in claim 1 wherein the stator and the rotor are formed from materials known magnetically permeable materials, including soft iron, nickel, cobalt and alloys thereof.

4. A generator as claimed in claim 1 wherein one of the electrical windings has a variable tap to allow variation in the voltage and current input/output ratios.

5. A generator as claimed in claim 1 wherein the gap is an air gap.

6. A generator as claimed in claim 1 wherein the gap is filled with a liquid such as water or oil.

7. A generator as claimed in claim 1 wherein the at least one turbine is a marine current turbine.

8. An electrical power generator is provided which comprises a stationary cable connected to the ground, a rotating blade carrying an electrical generator(s) to generate electrical power within a rotating frame and a rotating transformer arranged to transfer said electrical power from the rotating blade to the stationary cable, the transformer being of a rotating transformer type comprising a stator and a rotor arranged to rotate about an axis of the stator core with a gap therebetween, said rotor and said stator being arranged coaxially wherein said rotor is arranged radially about said stator, said stator and said rotor respectively having electrical windings arranged to create a magnetic flux which circulates between the stator and the rotor upon application of said electrical power as an alternating electrical current in one electrical winding in either the stator or the rotator so that a voltage is induced relative to said alternating electric current in the other electrical winding for a driving electrical current so that electrical power generated in said rotating frame is transferred between the windings across the gap between the stator and rotor, said stator having a hollow core for electrical cables coupled to the winding for delivery of said driving electrical current, said rotating frame carrying a power source to drive rotation, said rotatable power source being arranged to drive said electrical generator, said power source being at least one turbine having blades driven by the force of a fluid acting on said turbine blades wherein said at least one turbine is a wind turbine designed to operate at high altitudes such that said wind turbine is free from a rigid connection to the ground.

* * * * *